United States Patent
Komarechka

(10) Patent No.: US 6,239,501 B1
(45) Date of Patent: May 29, 2001

(54) FOOTWEAR WITH HYDROELECTRIC GENERATOR ASSEMBLY

(76) Inventor: Robert Komarechka, 537 Haig Street, #1, Sudbury, Ontario (CA), P3C 1E2

( * ) Notice: Subject to any disclaimer, the term of this patent is extended or adjusted under 35 U.S.C. 154(b) by 0 days.

(21) Appl. No.: 09/318,815

(22) Filed: May 26, 1999

(30) Foreign Application Priority Data

May 26, 1998 (CA) .................................................. 2238592

(51) Int. Cl.[7] ..................................................... H02P 9/04
(52) U.S. Cl. ........................... 290/1 R; 310/75 B; 36/2.6
(58) Field of Search .................. 310/75 B; 290/1 R; 36/2.6, 3 B

(56) References Cited

U.S. PATENT DOCUMENTS

| | | |
|---|---|---|
| 1,506,282 * | 8/1924 | Barbieri ............................. 310/75 B |
| 4,674,199 | 6/1987 | Lakic . |
| 4,736,530 * | 4/1988 | Lakic et al. ............................... 36/2.6 |
| 4,782,602 | 11/1988 | Lakic . |
| 4,845,338 | 7/1989 | Lakic . |
| 4,870,700 | 9/1989 | Ormanns et al. . |
| 4,941,271 * | 7/1990 | Lakic ..................................... 36/2.6 |
| 5,167,082 | 12/1992 | Chen . |
| 5,195,254 * | 3/1993 | Tyng ..................................... 36/3 R |
| 5,341,581 | 8/1994 | Huang . |
| 5,367,788 | 11/1994 | Chen . |
| 5,495,682 | 3/1996 | Chen . |
| 5,860,727 * | 1/1999 | Chien ..................................... 362/84 |
| 5,918,381 * | 7/1999 | Landry ................................... 36/3 B |

* cited by examiner

*Primary Examiner*—Joseph Waks
(74) *Attorney, Agent, or Firm*—Santosh K. Chari; Orange & Chari

(57) ABSTRACT

A hydroelectirc generator assembly for use in footwear includes a pair of fluid filled sacs contained in the sole of the footwear. The sacs are connected by conduits whereby, when the footwear is used for walking, fluid is transferred between the sacs, via the conduits. A turbine positioned between the conduits is rotated by the moving fluid thereby resulting in the generation of electricity.

8 Claims, 3 Drawing Sheets

US 6,239,501 B1

FOOTWEAR WITH HYDROELECTRIC GENERATOR ASSEMBLY

The present invention relates to the field of portable electric generators. More specifically, the present application relates to footwear having a hydroelectric generator assembly located therewithin.

BACKGROUND OF THE INVENTION

With the increase in the number of battery powered, portable devices used both commercially and for recreation, there is an increasing need to provide a long lasting, adaptable, efficient electrical source. Two-way radios, GPS equipment, portable computers, cell phones, CD and tape players and the like generally use conventional batteries as a power source. These batteries may be disposable or rechargeable. Regardless of the type of battery used, after a certain time, the batteries in the equipment must be replaced with new or recharged batteries. This is inconvenient and, in many situations, requires the user to carry spare batteries.

There have been a number of attempts to provide electrical generator units which derive their power from the walking movement of the user. For example, U.S. Pat. No. 4,674,199 to Lakic discloses a shoe with an internal warming mechanism. The warming mechanism comprises an electrical resistance coil in the sole or the covering of the shoe and a mechanical electricity generation mechanism in the heel of the shoe. The generator is driven by the up and down movement of a wearers' heel. The generator described by Lakic includes an armature mounted for rotational movement in a magnetic field and mechanically connected to a vertical post which depends from the under surface of the heel portion of the inner sole of the shoe.

U.S. Pat. No. 4,870,700 to Ormanns discloses a personal safety radio device which can be mounted in the heel of a work shoe. The radio includes a transmitter powered by a rechargeable accumulator, a receiver and an antenna arrangement. Ormanns teaches that the rechargeable accumulator may be charged by a generator arrangement which includes a piezo-electric converter. The piezo-electric converter is arranged in the shoe such that it is acted on by the weight of the person wearing the shoe and thus converts the pressure of the weight into electrical energy.

U.S. Pat. No. 5,167,082 to Chen discloses a dynamo-electric shoe which has a pressure-operated electric generator inside a water tight compartment adjacent to the heel portion of the shoe. An electrical socket is mounted on the sole of the shoe and a rechargeable battery cell is wired to the electrical socket. Chen teaches that the dynamo-electric shoe can be used to operate a portable wireless telephone, a portable radio, a light device, a heating device or the like. The generator disclosed by Chen is mechanical.

U.S. Pat. No. 5,495,682 also to Chen discloses a similar dynamo-electric shoe in which the mechanical electric generator is operated by pressure on a pivot plate mounted to the heel of the shoe.

Other mechanical-type electricity generators are disclosed in U.S. Pat. Nos. 4,782,608, 4,845,338 and 5,367,788.

Mechanical electricity generators of the type known in the art have a number of disadvantages in that they are generally heavy, expensive to construct, require specialist shoe design, and are prone to mechanical breakdown.

It is an object of the present invention to provide a footwear-based electrical generation system which overcomes at least one of the disadvantages of the prior art.

SUMMARY OF THE INVENTION

Accordingly, in one aspect, the present invention provides a hydroelectric generator assembly for use within footwear, comprising:

a first compressible, fluid-filled sac for placement in a heel section of the footwear, the first sac having a first fluid conduit with a proximal end, connected to the first sac, and a distal end;

a second compressible, fluid-filled sac for placement in a toe section of the footwear, the second sac having a second fluid conduit with a proximal end, connected to the second sac, and a distal end;

the distal ends of the conduits each having an inlet and an outlet wherein the outlet and inlet of the first conduit is in fluid connection with the inlet and outlet, respectively, of the second conduit; and a hydroelectric generator module in fluid communication with the distal ends of the first and second conduits;

whereby, upon the wearer of the footwear walking, the first and second sacs are reciprocally compressed thereby causing fluid to flow from one of the sacs via the generator to the other of the sacs, resulting in generation of electricity by the generator.

BRIEF DESCRIPTION OF THE FIGURES

Embodiments of the present invention will now be described, by way of example only, with reference to the following figures, in which.

DESCRIPTION OF THE PREFERRED EMBODIMENTS

Figure 1:
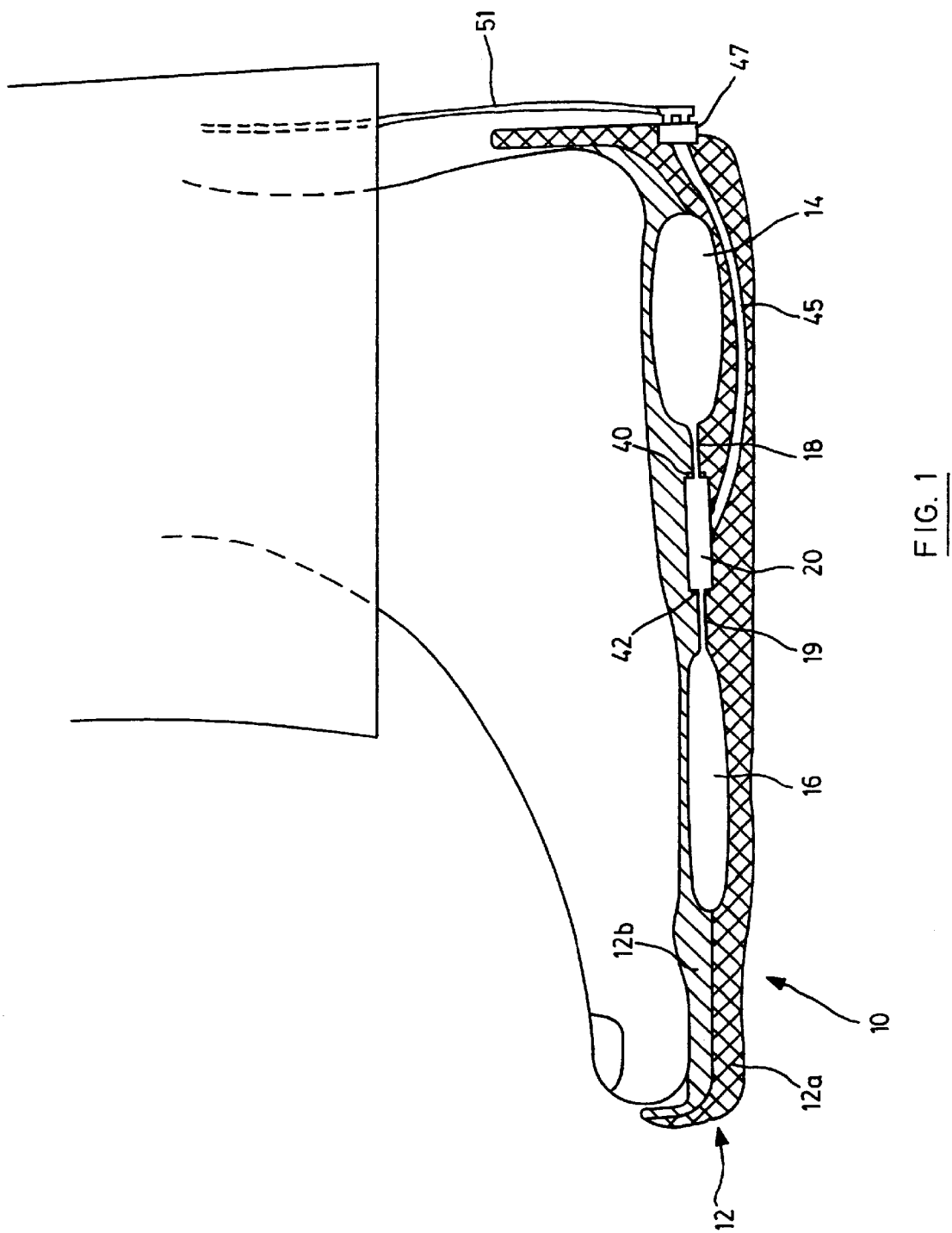
FIG. 1 is a partial cross-section through a shoe incorporating one embodiment of the present invention.
Figure 2:
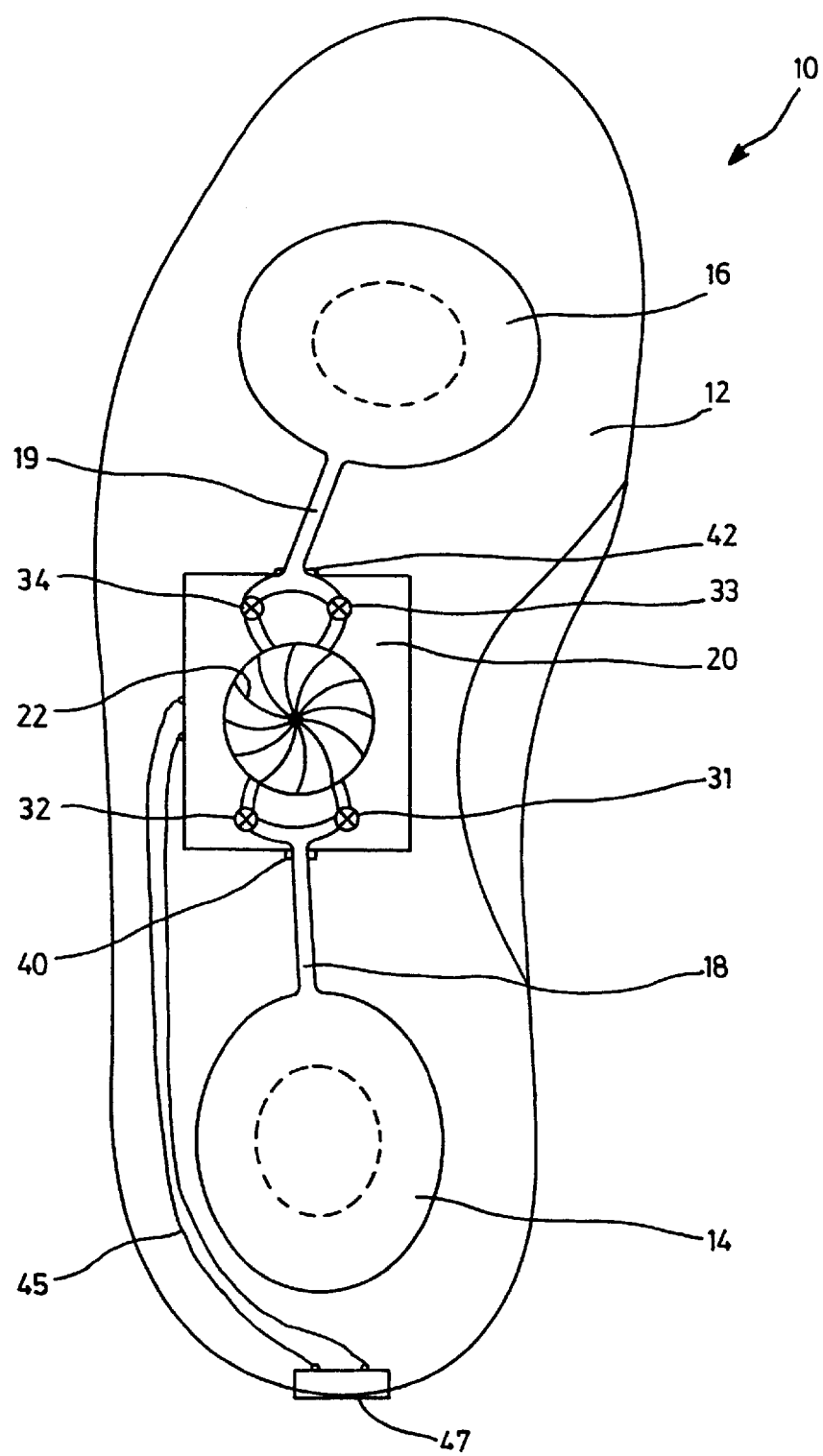
FIG. 2 is a schematic plan view of the shoe of FIG. 1.
Figure 3:
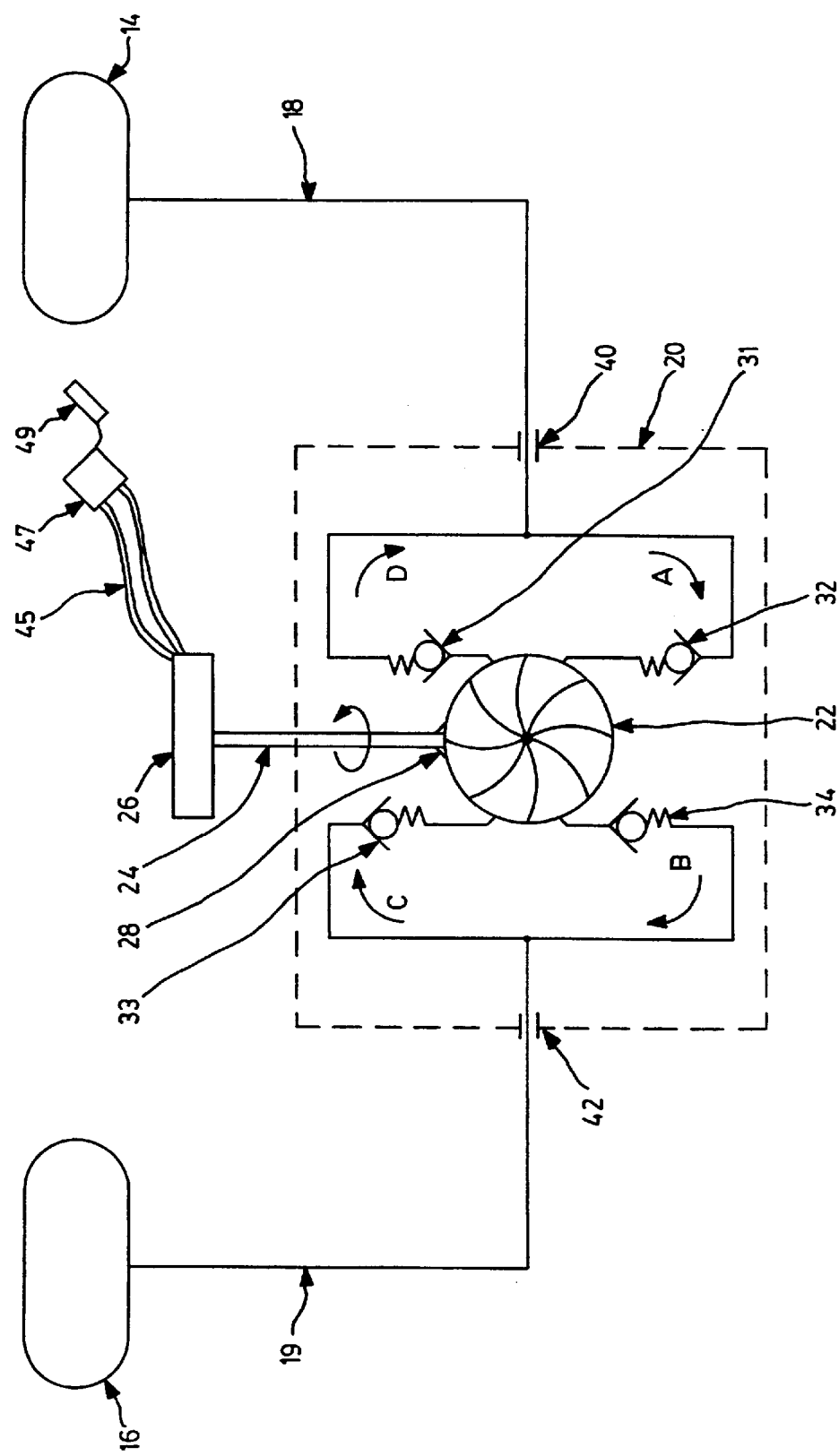
FIG. 3 is a schematic representation of the hydroelectric generator assembly of FIG.1.

A hydroelectric generator assembly in accordance with one embodiment of the present invention is shown in situ at 10 in FIGS. 1, 2 and 3. In this particular embodiment the assembly is formed within the sole 12 of an item of footwear. The sole is of two-part construction; a resilient hardwearing ground engaging lower section 12a and a flexible, comfortable foot support layer 12b.

The assembly generally comprises a pair of fluid-filled, compressible sacs 14 and 16 which are preferably located in the heel section of the sole and in a front section of the sole, i.e., the section which supports the ball of the foot, respectively. The sacs are located between the two sections of the sole. It will be appreciated that in other embodiments, the sacs 14 and 16 may be placed in other locations of the sole wherein the required function, as described below, may be obtained.

Each fluid sac 14 and 16 is connected by a fluid conduit (18 and 19, respectively) to a hydroelectric generator module 20. The hydroelectric generator module is preferably located between the pair of fluid sacs, in the arch support section of the sole. In an alternative embodiment the hydroelectric generator module may be located, for example, in the heel of a boot.

As shown in FIGS. 2 and 3, the hydroelectric generator module 20 preferably comprises a vane rotor 22 located within a turbine housing. The vane rotor drives a shaft 24 which communicates rotation of the vane rotor to a microgenerator 26. The microgenerator is designed to optimize electrical output over a variable rpm matched to the torque and rpm characteristics of the turbine. Shaft 24 may be provided with gearing to facilitate the efficiency optimization of the microgenerator. Suitable microgenerators are known in the art.

Depending on the nature of the fluid in the assembly, a shaft seal 28 is provided. The shaft seal allows for rotation of the shaft but prevents fluid leakage from the turbine housing. In an alternative embodiment, the microgenerator 26 may be immersed within a non-flammable hydraulic fluid, thereby negating the requirement for shaft seal 28.

Conduits 18 and 19 are bifurcated, with each arm of the conduit being provided with a check valve (31–34) to prevent reverse flow of the fluid through the turbine. The check valves may be, for example, spring loaded. Other conventional check valves may be employed, as will be apparent.

Conduits 18 and 19 are secured within hydroelectric generator module 20 by fittings 40 and 42, respectively.

Electricity generated by microgenerator 26 is conducted by wires 45 to a watertight socket 47 located on the exterior of the sole. The watertight socket may be provided with a protective cap 49 which protects the socket when not in use.

In an alternative embodiment, socket 47 and/or an additional socket (not shown) may be provided on the interior of the sole. Such an interior socket may be used to connect to, for example, electric foot warmers, electric coolers or a rechargeable battery pack located within the footwear itself.

When located on the exterior, socket 47 is used as a connector to supply electricity via external wires 51, as shown in FIG. 1, to the desired portable device. In a preferred mode of operation, wires 51 are connected to a power control output unit (not shown) which can be mounted on a user's belt. Electronic devices can be attached to this power control output unit. The unit helps ensure an even supply of electricity, regardless of whether the user is in motion at the time. The power control output unit also allows for the regulation of the output voltage so the system is adaptable to a variety of equipment. When the electricity is not being used, the generated electricity can be stored in a rechargeable battery pack which, once again, can be carried on a user's belt.

In use, when the wearer of the footwear walks, the downward movement of the wearer's heel within the footwear will result in compression of the fluid filled sac 14. Fluid will be forced through conduit 18 and into hydroelectric generator module 20. The fluid will flow through one arm of the bifurcated conduit, through the forward-flow check valve 32 and into the turbine housing (Arrow A). Movement of the fluid will result in rotation of the vane rotor 22 and shaft 24, thereby producing electricity by means of microgenerator 26.

Fluid will then pass through the turbine housing under pressure and exit via check valve 34, along conduit 19 and into sac 16 (Arrow B).

As the user continues the stride, the heel will be lifted and downward pressure will be exerted on sac 16 preferably located under the ball of the user's foot. In this manner, Sac 16 will be compressed, forcing fluid under pressure back through conduit 19 and into the turbine housing via check valve 33 (Arrow C). Once again, movement of the fluid will result in rotation of the vane rotor 22 and shaft 24, thereby producing electricity in microgenerator 26.

Fluid will then pass through the turbine housing under pressure and exit via check valve 31, through conduit 18 and back into sac 14 (Arrow D).

In the embodiment shown in FIGS. 1 and 2, the hydroelectric generator assembly is located within the molded sole of a shoe or boot. The assembly may be formed integral with the sole or may be formed as a separate unit which can be inserted into cavities in a pre-formed sole. This latter arrangement would allow for access to the various components of the assembly via a removable insole.

Various hydraulic fluids may be used in the present application. These fluids include, for example, water, brine, glycerine solutions, alcohol solutions, silicon based oils, petroleum oils and vegetable, grain and fish oils. The selection of a suitable fluid would depend upon the parameters of the turbine assembly as well as the conditions in which the footwear is to be used. For example, if the footwear is to be used in extreme cold environments, it is preferable that the fluid have a low freezing point and a low viscosity.

In an alternative embodiment, the entire hydroelectric generator assembly may be formed within an insole which can be removably placed within existing footwear. As will be apparent, in this particular embodiment, the socket into which appliances may be plugged will be located adjacent the insole and will not be formed as an integral part of the shoe or boot. In order to be able to keep the insole as thin as possible, it is preferable if the fluid sacs are thin but cover a large surface area, thereby maximizing the volume of fluid which can be displaced without comprising on thickness. As the inside embodiment must be extremely durable, it is envisioned that the fluid sacs may be attached directly to the hydroelectric generator module, with the check valves being formed at the junction between the sac wall and the module. In this particular case the check valves themselves, would act as the fluid conduits, thereby negating the necessity for tubing-type conduits.

In yet another embodiment, fluid may only pass through the hydroelectric generator module as it flows in one direction, for example, from the heel sac to the front sac. In the reverse direction the fluid passes along a conduit which connects directly between the front sac and the heel sac, i.e., the hydroelectric generator module is bypassed.

The hydroelectric generator module has been described with reference to a turbine assembly. However, other hydroelectric generating systems such as magnetohydrodynamic systems may also be used. In the case of a magnetohydrodynamic system, a magnetic hydraulic fluid may be used, wherein the magnetic fluid passes along a conduit, through an electric coil. Movement of the magnetic fluid within the coil will result in the generation of electricity. In an alternative magnetohydrodynamic system, a conductive fluid may be passed through a coiled conduit located within a magnetic field. Electricity will be generated in conductive electrode strips located on opposite sides of the coil. Suitable magnetic hydraulic fluids would include, for example, mercury or hydraulic fluids which contain a suspension of fine magnetic materials therein. Ferromagnetic fluids of this type are known in the art.

The present application has been described with reference to various presently preferred embodiments. Modifications and variations of these embodiments will be apparent to a person of skill in the art. Such modifications and variations are believed to be within the scope of the present invention as defined in the claims appended hereto.

The embodiments of the invention in which an exclusive property or privilege is claimed are defined as follows:

1. A hydroelectric generator assembly for use within footwear, comprising:

a first compressible, fluid-filled sac for placement in a heel section of the footwear, the first sac having a first fluid conduit with a proximal end, connected to said first sac, and a distal end;

a second compressible, fluid filled sac for placement in a toe section of the footwear, the second sac having a second fluid conduit with a proximal end, connected to said second sac, and a distal end;

said distal ends of said conduits each having an inlet and an outlet wherein the outlet and inlet of said first conduit is in fluid connection with the inlet and outlet, respectively, of said second conduit; and a hydroelectric generator module in fluid communication with the distal ends of said first and second conduits;

whereby, upon the wearer of said footwear walking, said first and second sacs are reciprocally compressed thereby causing fluid to flow from one of said sacs via said generator to the other of said sacs, resulting in generation of electricity by said generator.

2. The hydroelectric generator assembly according to claim 1 further comprising an electrical socket wired to an outlet of said hydroelectric generator module.

3. The hydroelectric generator assembly according to claim 1 wherein said hydroelectric generator module comprises a turbine assembly.

4. The hydroelectric generator assembly according to claim 1 wherein said hydroelectric generator module comprises a coil and said fluid passing therethrough is a magnetic fluid.

5. The hydroelectric generator assembly according to claim 4 wherein said inlets and outlets of said conduits valves for ensuring a unidirectional flow of said fluid therethrough.

6. The hydroelectric generator assembly according to claim 1, wherein the fluid in said first and second sacs is an electrically conductive fluid and wherein said hydroelectric generator module comprises a coiled conduit through which said conductive fluid flows, the coiled conduit being located within a magnetic field and having a pair of conductive electrode strips on opposed sides thereof.

7. The hydroelectric generator assembly of claim 6 wherein said inlets and outlets of said conduits include valves for ensuring a unidirectional flow of said fluid therethrough.

8. The hydroelectric generator assembly of claim 1 wherein said inlets and outlets of said conduits include valves for ensuring a unidirectional flow of said fluid therethrough.

* * * * *